UNITED STATES PATENT OFFICE.

GEORGE W. WHEAT, OF PHILIPSBURG, PENNSYLVANIA.

IMPROVEMENT IN RAILWAY-CAR COUPLINGS.

Specification forming part of Letters Patent No. 107,988, dated October 4, 1870.

*To all whom it may concern:*

Be it known that I, GEORGE W. WHEAT, of Philipsburg, in the county of Centre and State of Pennsylvania, have invented a new and useful Improvement in Car-Coupling; and I do hereby declare that the following is a full, clear, and exact description thereof, which will enable others skilled in the art to make and use the same, reference being had to the accompanying drawing, forming part of this specification, in which—

Figure 1 is a side view of my improved car-coupling, parts being broken away to show the construction. Fig. 2 is a front view of the same.

Similar letters of reference indicate corresponding parts.

My invention has for its object to furnish an improved car-coupling which shall be simple in construction, effective in operation, will couple the cars automatically when they are run together, and may be easily and conveniently uncoupled; and it consists in the construction and combination of the various parts of the coupling, as hereinafter more fully described.

A represents the bumper-head, which is secured to the frame-work of the car in the ordinary manner, and the mouth of which is made hopper-shaped, in the usual way. B is an ordinary coupling-link. C is a projection formed upon or securely attached to the lower side of the interior or cavity of the bumper-head A. The forward side or edge of the projection C is made inclined, so that the entering-link B may readily slide up and pass over the said projection. The rear edge of the projection C is made straight to receive the link and sustain the draft.

D is a tongue or plate, the rear end of which is pivoted to the sides of the rear part of the bumper-head A in such a position that the forward part of said tongue or plate may rest upon the top of the projection C. The lower edge of the forward end of the tongue or plate D is beveled off, as shown in Fig. 1, to serve as a guide to the entering link.

E is the angular lock-lever, which is pivoted at its angle to the top of the bumper-head A, and which works in a slot in the upper side of the said bumper-head. The short arm of the lever E is made of such a length that its lower end may rest upon the plate or tongue D and lock the coupling when the upper end or arm of said lever is moved forward, in which position the lever is securely held by its own weight.

F is a slide moving in a recess in the rear part of the long arm of the lever E, and the movement of which is limited by a projection formed upon its lower part, and working in the enlarged lower part of the said recess, as shown in dotted lines in Fig. 1. To the upper end of the slide F is attached a ring, for convenience in operating it, and the said slide is made longer than the long arm of the lever E, so that its lower end may project, as shown.

G is a lever, pivoted to supports formed upon or attached to the under side of the rear part of the bumper-head A. To the forward end of the lever G is pivoted a bar or block, H, which passes up through a slot in the lower side of the bumper-head A, just beneath the inner end of the link B, so that when the bar H is raised by operating the lever G, it may raise the link B above the projection C, allowing the said link B to be readily drawn out, uncoupling the cars.

To the rear end of the lever G is pivoted the lower end of the rod I, which passes up through a hole in the rear part of the bumper-head A, to enable the said lever G to be conveniently operated.

J is an ordinary coupling-pin, which may be placed in the rear hole, $a^1$, of the bumper-head A, to serve as a stop to prevent the link B from being pushed too far in, and to keep the inner end of said link in proper position to be raised by the bar H. The pin J may also be placed in a hole, $a^2$, in forward part of the bumper-head, to couple the cars in the manner of an ordinary coupling when required.

G. Wilkes,
Iron Pavement.
No. 107,989.      Patented Oct. 4, 1870.
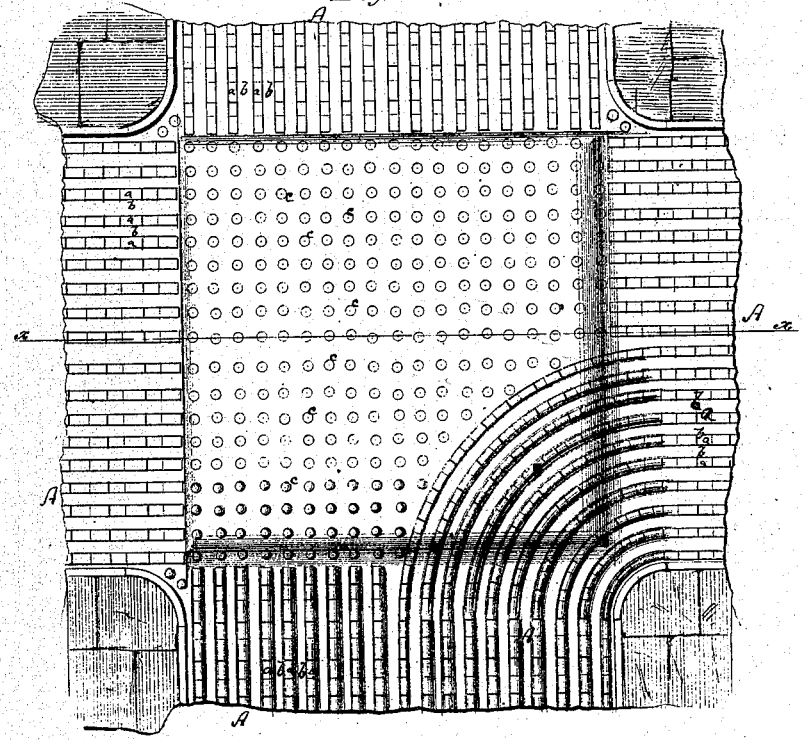

In uncoupling the cars the brakeman presses down slightly upon the rod I, which raises the link B. At the same time he draws up the slide F and raises the upper arm of the lever E into a perpendicular position, unlocking the coupling and allowing the link B to be easily drawn out. The brakeman then drops the slide F, the lower end of which passes down through a slot in the tongue or plate D, so that as the brakeman passes back the upper end of the lever E, the forward end of the said tongue or plate will be raised, or set so as to